(12) United States Patent
Sheng

(10) Patent No.: US 12,224,610 B2
(45) Date of Patent: Feb. 11, 2025

(54) BATTERY-OPERATED DEVICE INCLUDING AN ELECTROMECHANICAL INTERFACE FOR AN INTERCHANGEABLE DRIVE UNIT

(71) Applicant: Robert Bosch GmbH, Stuttgart (DE)

(72) Inventor: Jing Sheng, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 419 days.

(21) Appl. No.: 17/281,147

(22) PCT Filed: Dec. 11, 2019

(86) PCT No.: PCT/EP2019/084578
§ 371 (c)(1),
(2) Date: Mar. 29, 2021

(87) PCT Pub. No.: WO2020/126728
PCT Pub. Date: Jun. 25, 2020

(65) Prior Publication Data
US 2022/0123572 A1 Apr. 21, 2022

(30) Foreign Application Priority Data
Dec. 20, 2018 (DE) .......................... 102018222381.5

(51) Int. Cl.
*H02J 7/00* (2006.01)
*A47L 7/00* (2006.01)
(Continued)

(52) U.S. Cl.
CPC .......... *H02J 7/0063* (2013.01); *A47L 7/0095* (2013.01); *A47L 9/2873* (2013.01); *A47L 9/2884* (2013.01);
(Continued)

(58) Field of Classification Search
CPC ...... H02J 7/0063; H02J 7/0042; H02J 7/0068; H02J 50/10; A47L 7/0095; A47L 9/2873; A47L 9/2884; B23B 45/02
See application file for complete search history.

(56) References Cited

U.S. PATENT DOCUMENTS

| 6,448,732 B1 * | 9/2002 | Block | A47L 9/2889 |
| | | | 318/245 |
| 2008/0256742 A1 * | 10/2008 | Bertram | A47L 9/00 |
| | | | 15/327.2 |

(Continued)

FOREIGN PATENT DOCUMENTS

| CA | 2420497 C * | 6/2011 | A47L 5/32 |
| CN | 101055985 A | 10/2007 | |

(Continued)

OTHER PUBLICATIONS

International Search Report for PCT/EP2019/084578 Issued Mar. 5, 2020.

(Continued)

*Primary Examiner* — Bickey Dhakal
(74) *Attorney, Agent, or Firm* — NORTON ROSE FULBRIGHT US LLP; Gerard A. Messina

(57) ABSTRACT

A battery-operated device including a rechargeable battery and an interchangeable drive unit that is supplied with power by the rechargeable battery via an electromechanical interface is provided. The rechargeable battery is chargeable via the electromechanical interface.

5 Claims, 6 Drawing Sheets

(51) Int. Cl.
*A47L 9/28* (2006.01)
*B08B 15/04* (2006.01)
*B23B 45/02* (2006.01)
*H02J 50/10* (2016.01)

(52) U.S. Cl.
CPC .............. *B08B 15/04* (2013.01); *B23B 45/02* (2013.01); *H02J 7/0042* (2013.01); *H02J 7/0068* (2013.01); *H02J 50/10* (2016.02)

(56) References Cited

U.S. PATENT DOCUMENTS

2013/0335900 A1   12/2013   Jang
2016/0336793 A1*  11/2016   Seman, Jr. .............. H02P 25/14

FOREIGN PATENT DOCUMENTS

| CN | 103684202 | A | 3/2014 | | |
| CN | 104221277 | A | 12/2014 | | |
| CN | 106923745 | A | 7/2017 | | |
| DE | 60003499 | T2 | 5/2004 | | |
| DE | 102005038923 | A1 | 2/2007 | | |
| DE | 202008000614 | U1 | 3/2008 | | |
| DE | 102008040793 | A1 | 2/2010 | | |
| DE | 102015226021 | A1 | 6/2017 | | |
| DE | 102016101004 | A1 | 7/2017 | | |
| DE | 102017201567 | A1 | 8/2018 | | |
| EP | 1780867 | A2 * | 5/2007 | .......... | H01M 2/1022 |
| EP | 2149977 | A2 * | 2/2010 | ................ | H02P 7/29 |

OTHER PUBLICATIONS

Yi, et al.: "Research on the Development Trend of Lithium Battery Pack for DC Power Tools," CN Acad. J. Electronic Publ. (2020)(6), pp. 1-10, with English Translation.

\* cited by examiner

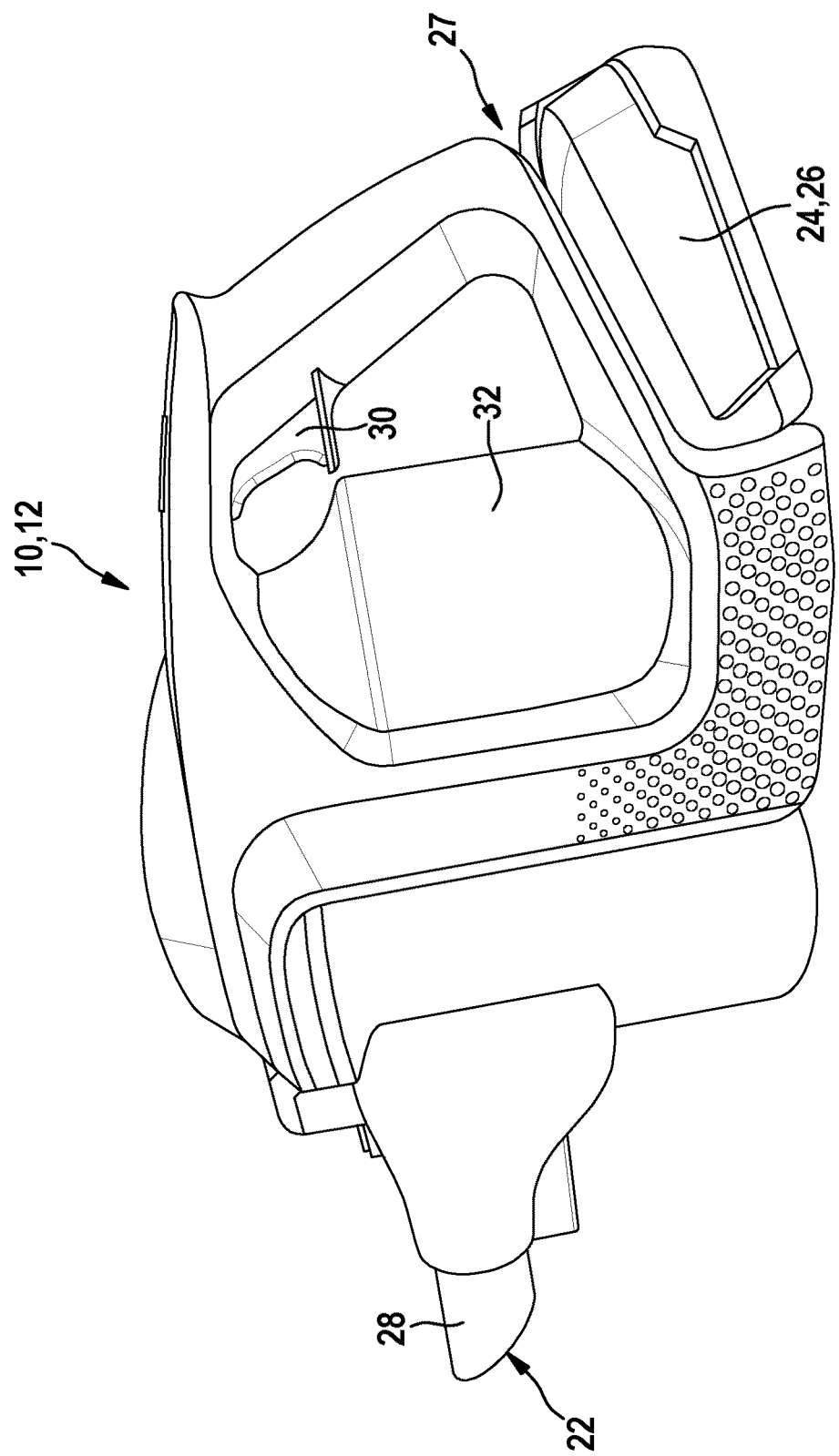

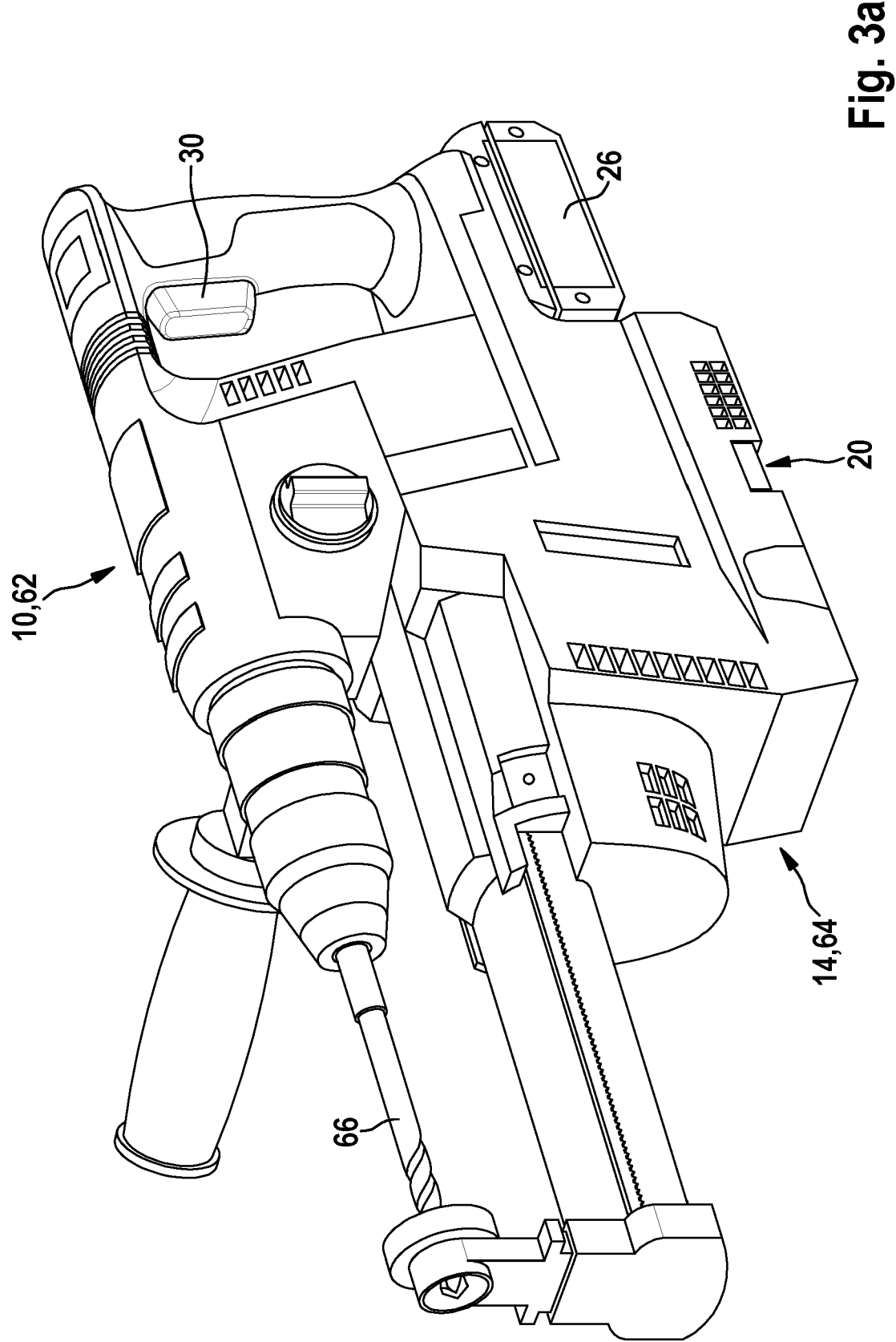

BATTERY-OPERATED DEVICE INCLUDING AN ELECTROMECHANICAL INTERFACE FOR AN INTERCHANGEABLE DRIVE UNIT

FIELD

The present invention relates to a battery-operated device including a rechargeable battery and an interchangeable drive unit that is supplied with power by the rechargeable battery via an electromechanical interface.

BACKGROUND INFORMATION

The power supply of a battery-operated device takes place either via a fixedly integrated rechargeable battery or via an interchangeable battery or an interchangeable battery pack that may be connected to the battery-operated device with the aid of a first electromechanical interface. Interchangeable battery packs usually include a housing that is connectable to the power tool or the charging device in a detachably force-fitted and/or form-locked manner via an electromechanical interface. Furthermore, the interchangeable battery or the interchangeable battery pack includes at least one battery cell and one electrical interface, via which the at least one battery cell is electrically connectable to the power tool or the charging device. Battery-operated devices often also have a further electromechanical interface for an interchangeable drive unit that is in turn provided with the necessary power by the rechargeable battery of the battery-operated device. A connection, which is detachable in a force-fitted and/or form-locked manner, of the interchangeable drive unit to the battery-operated device takes place via the further electromechanical interface. Since the implementation of the first electromechanical interface provided for the interchangeable battery or interchangeable battery pack is of subordinate importance to the present invention, it is not to be discussed here in greater detail. Interfaces of this type for connecting removable batteries or interchangeable battery packs are conventional. For this reason, if an electromechanical interface of the battery-operated device is discussed in the context of the present invention, it is understood to always refer to the interchangeable drive unit.

A charging device of a robot vacuum cleaner that is likewise suitable for charging a battery integrated into a hand-held vacuum cleaner is described in U.S. Patent Application Publication No. US 2013/0335900 A1. For this purpose, the hand-held vacuum cleaner may be inserted very easily into a charging slot of the charging device with the tip of its suction nozzle, at which there are corresponding charging contacts. A comparable device is also described in China Patent Application No. CN 106923745 A.

Many vacuum cleaners additionally offer the possibility of connecting a suction nozzle having a rotary brush driven by an electric motor to the vacuum cleaner via an electromechanical interface. For this purpose, the electromechanical interface is usually provided at the vacuum cleaner in such a way that it transfers the required power either directly to a corresponding counter-interface of the suction nozzle or via a telescopic extension tube having corresponding electromechanical interfaces at its two ends.

Moreover, for some conventional battery-operated power tools, an accessory device driven by an electric motor is attachable via an electromechanical interface. A percussion drill is described in German Patent Application No. DE 10 2017 201 567 A1, for example, which is provided with power via an interchangeable battery pack and to which an electrically driven accessory device in the form of a suction device for drilling debris, drilling dust, or the like, is attachable via an electromechanical interface. The suction device includes an integrated electric motor that is supplied with power by the interchangeable battery pack of the percussion drill.

Example embodiments of the present invention make available a simple, cost-effective, and practical possibility of charging a rechargeable battery of a battery-operated device with the aid of an already present electromechanical interface for an interchangeable drive unit.

SUMMARY

It is provided according to an example embodiment of the present invention that the battery is chargeable via the electromechanical interface of the battery-operated device that is usually provided for supplying the interchangeable drive unit with power. Since the electromechanical interface thus assumes a double function for the interchangeable drive unit, it is particularly advantageously possible to dispense with further interfaces, contacts and connections that are explicitly necessary to charge the battery. In the case of an interchangeable battery or an interchangeable battery pack, the present invention also offers the advantage that these may now be charged directly in the device and do not need to be additionally removed for the charging process and plugged into an appropriate charging device. On the one hand, this thus allows the interchangeable battery to be charged quickly and conveniently and on the other hand, allows the flexibility (quickly switching from an empty to a full interchangeable battery to be able to seamlessly continue the operation) gained as a result of removable batteries may be maintained. In the following, the terms "battery," "interchangeable battery," and "interchangeable battery pack" are understood to be synonymous in the sense of the present invention.

In the context of the present invention, a battery-operated device is to be understood to mean each device, at which an interchangeable drive unit is operable via an electromechanical interface. One example of battery-operated devices are power tools for processing workpieces with the aid of an electrically driven insert tool. In this case, the power tool may be designed as a hand-held power tool and as a steady-state power tool. In this context, typical power tools are hand-held or steady-state drills, screwdrivers, percussion drills, planers, angle grinders, sheet orbital sanders, buffing machines, or the like. Gardening tools, such as lawn mowers, grass trimmers, branch saws or the like are also considered to be battery-operated device. The present invention is furthermore usable for battery-operated household appliances, such as vacuum cleaners, blenders, etc.

The battery voltage of a rechargeable battery is generally many times higher than the voltage of an individual battery cell and results from connecting (in parallel or in series) the individual battery cells. A battery cell is typically implemented as a galvanic cell which has a design, in the case of which one cell pole is situated at one end and another cell pole is situated at an opposite end. In particular, the battery cell has a positive cell pole at one end and a negative cell pole at an opposite end. The battery cells are preferably designed as lithium-based battery cells, for example Li-Ion, Li—Po, Li-metal or the like. The present invention is, however, applicable to battery-operated devices having Ni—Cd, Ni-MH cells or other suitable cell types. Common Li-Ion battery cells having a cell voltage of 3.6 V result in battery voltages of 3.6 V, 7.2 V, 10.8 V, 14.4 V, 18 V, 36 V, etc., by way of example. The battery cell is preferably designed as an at least essentially cylindrical round cell, the cell poles being situated at the ends of the cylinder shape. However, the present invention does not depend on the type and design of the utilized battery cells, but may be applied to any arbitrary battery or battery cell.

Batteries having Li-Ion cells, in particular, are in general charged according to a so-called CCCV (constant current constant voltage) method. In this case, a charge electronics system of the charging device generates a constant charging current with the aid of the battery (constant current—CC), so that the battery voltage increases. As soon as the maximal battery voltage is reached, it is kept constant (constant voltage—CV) by the charge electronics system and the charging current is reduced. As soon as a predefined minimal value of the charging current is reached, the charge electronics system terminates the charging process and the battery cells are fully charged.

In a further embodiment of the present invention, it is provided that the electromechanical interface includes at least two electrical contacts or one coil for supplying the interchangeable drive unit with power. In this case, a first contact of the electromechanical interface or coil is connected to a drain or collector terminal of a first semiconductor switch and a second contact of the electromechanical interface or coil is connected to a source or emitter terminal of the first semiconductor switch. MOSFET, bipolar transistors, IGBT or the like are particularly suitable as semiconductor switches. In the case of a coil instead of the electrical contacts, the power transfer takes place inductively via the electromechanical interface. It should be noted that the mechanical implementation of the electromechanical interface for the detachable connection of the interchangeable drive unit in a force-fitted and/or form-locked manner is not to be the subject matter of the present invention. Those skilled in the art will select a suitable specific embodiment for the mechanical connection depending on the drive unit. A vacuum cleaner nozzle may thus be implemented completely differently from the dust suction system of a percussion drill, for example. The electrical contacts or coil as well as the components activating same are far more important for the present invention. A "detachable connection" is to be understood to mean a connection that is detachable and attachable without the use of tools, i.e., by hand.

A voltage drop may be detected with the aid of a control unit via the first semiconductor switch or the coil. The control unit recognizes as a function of the voltage drop, whether the interchangeable drive unit or a charging device is connected to the electromechanical interface. Thus, the electromechanical interface may particularly advantageously have a very simple design. A particular adaptation of the electromechanical interface to the charging or double function is not necessary, since it is implemented by the control unit. If the electromechanical interface also includes further electrical contacts, for example for detecting operating states of the interchangeable drive unit, these further electrical contacts may be used by the control unit alternatively or additionally to detect a connected charging device.

The first semiconductor switch is preferably a part of a power output stage having at least one second semiconductor switch. In this way, the control unit may activate the interchangeable drive unit for different power stages via a pulse-width modulated signal. In the case of an electric motor, different rotational speeds may be implemented in this way.

A further semiconductor switch is switched in series to the power output stage, the control unit activating the at least two semiconductor switches of the power output stage and the further semiconductor switch in such a way that when the interchangeable drive unit is connected to the electromechanical interface, a power supply of the interchangeable drive unit takes place with the aid of the rechargeable battery and when the charging device is connected to the electromechanical interface, a charging of the rechargeable battery takes place.

The battery-operated device may be designed as a cordless vacuum cleaner, the interchangeable drive unit being a motor-driven suction nozzle. In one alternative embodiment, the battery-operated device may, however, also be a handheld power tool including an interchangeable drive unit designed as a motor-driven suction device. Further battery-operated devices including appropriate interchangeable drive units, such as gardening tools and household appliances, for example, may also be used, however. The present invention is also applicable to measuring devices that may be positioned with the aid of a removable, motor-driven swivel base.

BRIEF DESCRIPTION OF THE DRAWINGS

The present invention is explained below based on FIGS. 1 through 3 by way of example, identical reference numerals in the figures indicating components having the same functionality.

FIG. 1b shows the cordless vacuum cleaner from FIG. 1a in a second perspective view without an interchangeable drive unit.

FIG. 1c shows the cordless vacuum cleaner from FIG. 1a or

FIG. 1b in a further perspective view during the charging process in a charging device.

FIG. 3a shows in a first perspective view a second exemplary embodiment of the present invention on the basis of a percussion drill including an interchangeable drive unit designed as a motor-driven suction device, in accordance with an example embodiment of the present invention.

DETAILED DESCRIPTION OF EXAMPLE EMBODIMENTS

Figure 1A:
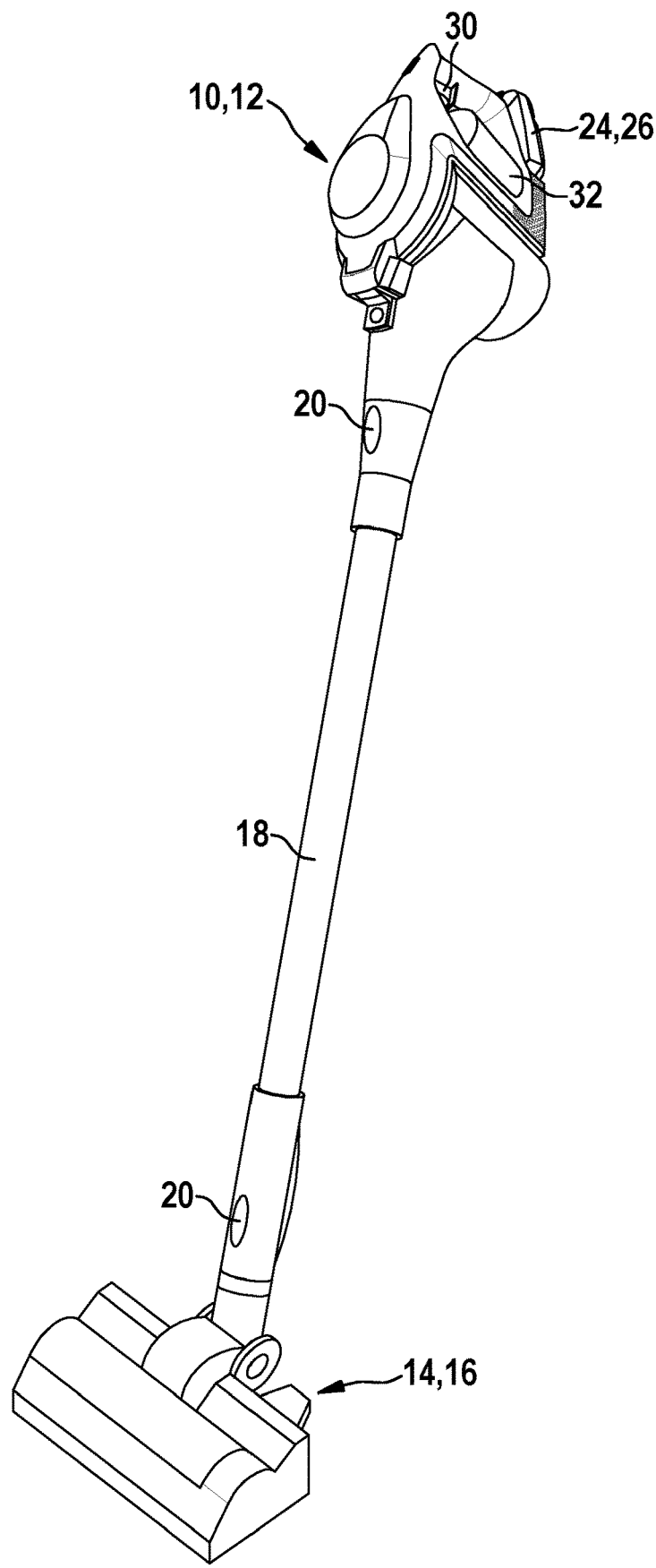
FIG. 1a shows a perspective view of a first exemplary embodiment of the present invention on the basis of a cordless vacuum cleaner including an interchangeable drive unit designed as a motor-driven suction nozzle.

In FIG. 1a, a first exemplary embodiment of the present invention is shown on the basis of a battery-operated device 10 that is designed as a cordless vacuum cleaner 12 and that is connected to an interchangeable drive unit 14 in the form of a motor-driven suction nozzle 16. The connection between cordless vacuum cleaner 12 and suction nozzle 16 takes place via a telescopic extension tube 18. Telescopic extension tube 18 has locking devices 20 at its two ends for detachably connecting to an electromechanical interface 22 (cf. FIG. 1*b*) of cordless vacuum cleaner 12 and a corresponding counter-interface (not shown) of drive unit 14. In this way, a user is able to operate locking device 20 by simply applying finger pressure for the purpose of establishing or releasing the connection. Telescopic extension tube 18 thereby serves almost like an electromechanical extension between electromechanical interface 22 of cordless vacuum cleaner 12 and the counter-interface of drive unit 14. The counter-interface of drive unit 14 may likewise be detachably connected directly without a telescopic extension tube to electromechanical interface 22 of cordless vacuum cleaner 12 via an appropriate locking device.

A battery 24 that is designed as an interchangeable battery pack 26 and that is detachably connected to cordless vacuum cleaner 12 via a further electromechanical interface 27 is used to supply cordless vacuum cleaner 12 with power. Since the mechanical implementation of further electromechanical interface 27 is not important for the present invention, it is not to be discussed in greater detail at this point. However, further electromechanical interface 27 must be designed, just as electromechanical interface 22, in such a way that it allows for a bidirectional energy flow, so that on the one hand, electrical power may flow from interchangeable battery pack 26 to cordless vacuum cleaner 12 for the purpose of operating same and on the other hand, electrical energy may flow from cordless vacuum cleaner 12 into interchangeable battery pack 26 for the purpose of charging same.

FIG. 1*b* shows cordless vacuum cleaner 12 in a further perspective view without an interchangeable drive unit 14. As already mentioned above, the latter may be detached and reattached by a user by manually actuating locking device 20. Electromechanical interface 22 for detachably connecting motor-driven suction nozzle 16 or other suction accessories to telescopic extension tube 18 is located at a tube extension 28 of cordless vacuum cleaner 12, which itself may be used directly as a suction nozzle. The motor-driven suction nozzle in turn includes a rotation brush (not shown) that is set into rotation by an electric motor (also not shown) that is situated in the suction nozzle. For this purpose, the electric motor of suction nozzle 16 is supplied with power via electromechanical interface 22 of cordless vacuum cleaner 12 and the counter-interface of suction nozzle 16 as a function of the actuation of a master switch 30 of cordless vacuum cleaner 12. If master switch 30 is actuated by a user, this results in a start of a suction motor 32 of cordless vacuum cleaner 12 and—in the case that removable suction nozzle 16 is mounted at tube extension 28 or at telescopic extension tube 18—also in the start of the electric motor of suction nozzle 16. In this case, cordless vacuum cleaner 12 may be designed in such a way that master switch 30 serves as an acceleration switch, with the aid of whose pressure travel the rotational speed of the electric motors may be controlled. Further embodiments to this extent follow in the context of FIG. 2.

Figure 1C:
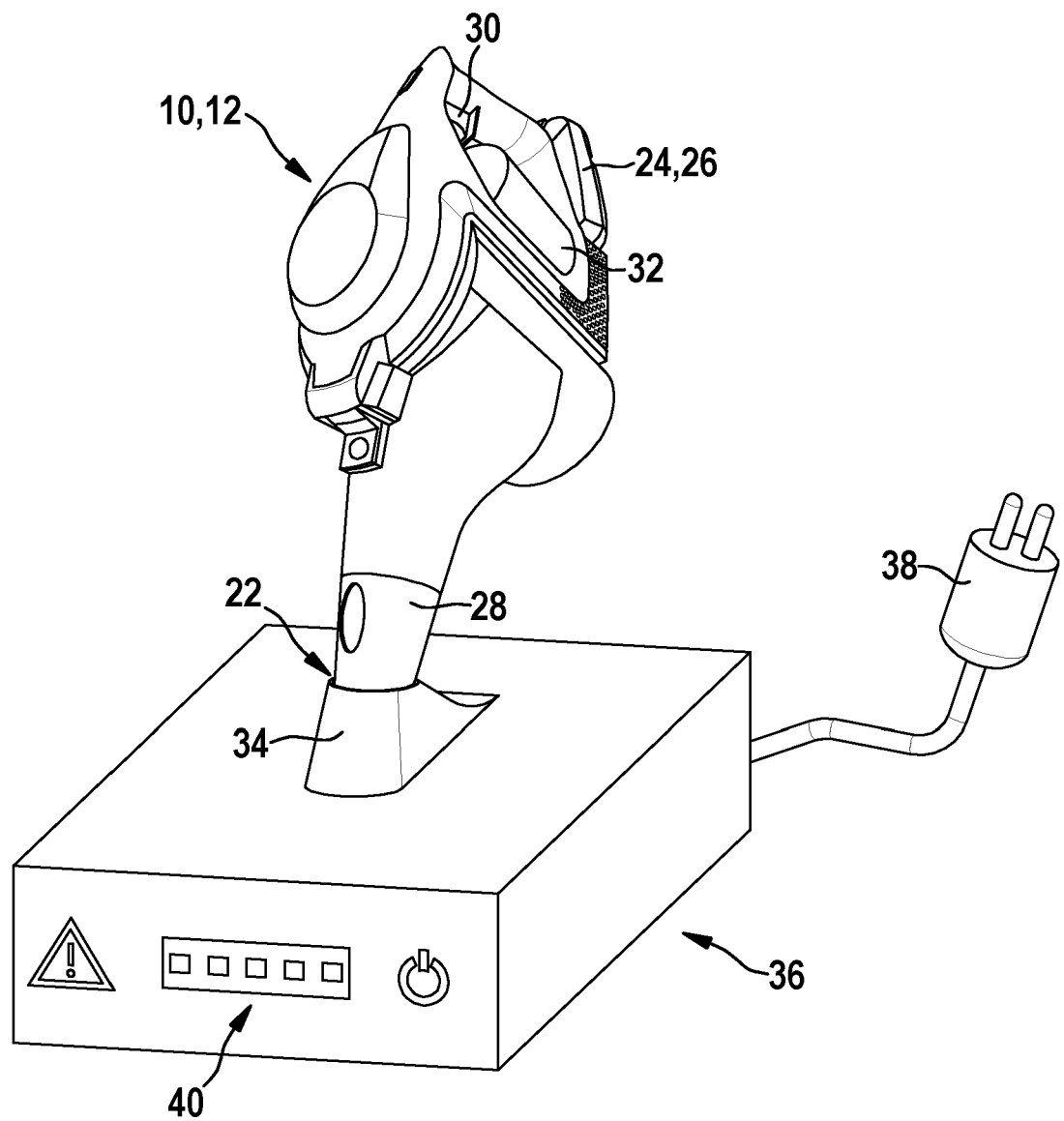

To charge interchangeable battery pack 26 quickly and easily, tube extension 28 of cordless vacuum cleaner 12 may now be plugged into a correspondingly designed receptacle 34 of a charging device 36 according to FIG. 1*c*. Charging device 36 must merely be adjusted to the specifications of interchangeable battery pack 26, in particular to its voltage, capacity, charging current and the like. In its simplest implementation, charging device 36 includes a power supply 38 and an operation display, a charge level indicator and/or an error display 40, so that the charging process starts automatically when cordless vacuum cleaner 12 is plugged into receptacle 34 and ends automatically when interchangeable battery pack 26 is fully charged. It is likewise possible that a charging device that is designed for interchangeable battery pack 26 may be provided with a plug-on adapter having a receptacle corresponding to receptacle 36 for electromechanical interface 22 of cordless vacuum cleaner 12. In this way, already present interchangeable battery pack charging devices may be retrofitted subsequently in an easy and reversible manner to directly charge the interchangeable battery pack via battery-operated device 10.

Figure 2A:
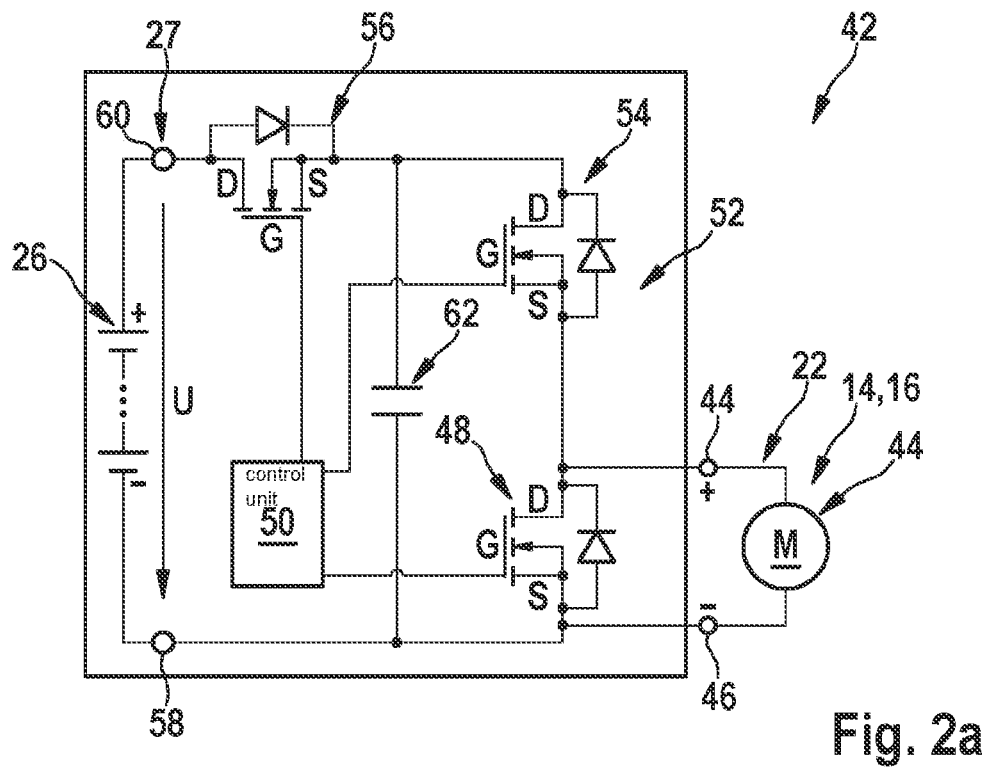
FIG. 2a shows a block diagram of a circuit of the battery-operated device for activating an interchangeable drive unit designed as an electric motor via an electromechanical interface of the battery-operated device, in accordance with an example embodiment of the present invention.

FIG. 2*a* shows a block diagram of a circuit 42 of battery-operated device 10 for activating interchangeable drive unit 14 designed as electric motor 44 via electromechanical interface 22 of battery-operated device 10. Battery-operated device 10 may be designed as a cordless vacuum cleaner 12 and interchangeable drive unit 14 as a suction nozzle 16 with reference to the first exemplary embodiment according to FIG. 1.

Electromechanical interface 22 has a first contact 44 and at least one second contact 46 for the purpose of supplying electric motor 44 of suction nozzle 16 with power. First contact 44 is connected to a drain terminal D of a first semiconductor switch 48 and second contact 46 is connected to a source terminal S of first semiconductor switch 48. In the present case, the semiconductor switch is designed as a MOSFET that is activated via a gate terminal G by a control unit 50 of cordless vacuum cleaner 12. First semiconductor switch 48 is part of a power output stage 52 having at least one second semiconductor switch 54 that is connected in series to first semiconductor switch 48 for the purpose of implementing a so-called two-quadrant actuator.

Figure 2B:
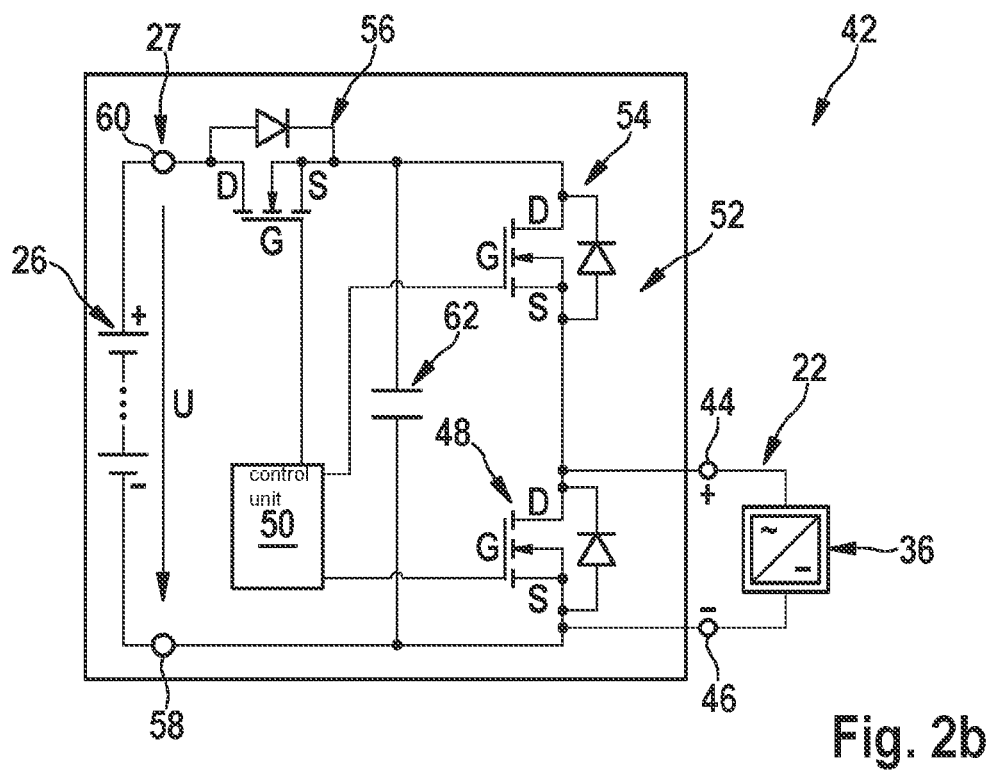
FIG. 2b shows a block diagram of the circuit activated according to the present invention of the battery-operated device for charging a battery via the electromechanical interface of the battery-operated device, in accordance with an example embodiment of the present invention.

A further semiconductor switch 56 is connected in series to power output stage 52, control unit 50 activating the at least two semiconductor switches 48, 54 of power output stage 52 and further semiconductor switch 56 in such a way that upon connecting suction nozzle 16 to electromechanical interface 22 and as a function of master switch 30, a power supply of suction nozzle 16 takes place with the aid of interchangeable battery pack 26. For this purpose, interchangeable battery pack 26 supplies circuit 42 via a first contact 58 and at least one second contact 60 of further electromechanical interface 27 of cordless vacuum cleaner 12 with a d.c. voltage U. Control unit 50 detects the state of master switch 30 (not illustrated in FIG. 2*a* for the sake of clarity) in such a way that when master switch 30 is actuated by a user, it activates the two semiconductor switches 48, 54 of power output stage 52 with the aid of correspondingly pulse-width modulated (PWM) signals in the sense of a two-quadrant actuator. It is possible in this way to implement a speed control of electric motor 44 as a function of the pressure travel of master switch 30. The charging process of interchangeable battery pack 26 may be interrupted completely with the aid of further semiconductor switch 56. In addition, a capacitor 62 is used to suppress any electromagnetic interferences due to the PWM. It should also be noted that all semiconductor switches illustrated in FIGS. 2*a* and 2*b* are designed as MOSFETs having corresponding intrinsic diodes, the intrinsic diode of semiconductor switch 48 being used in particular as a freewheeling diode for electric motor 44. Bipolar transistors, IGBTs, etc., may, however, also be used as semiconductor switches instead of MOSFETs, without restricting the present invention. Furthermore, control unit 50 may be implemented with the aid of a microprocessor, a DSP, a FPGA or the like, but also with the aid of a discrete design. Instead of an electric motor 44, interchangeable drive unit 14 may ultimately also include other electric drives and actuators, such as piezoelectric drives, sound generators, vibration actuators, electromagnets, light emitting elements, etc., for example.

If battery-operated device 10 or cordless vacuum cleaner 12 are now connected to charging device 36 according to FIG. 1c via electrical contacts 44, 46 of its electromechanical interface 22, then this is detected by control unit 50 according to FIG. 2b with the aid of a corresponding voltage drop via first semiconductor switch 48. It is important in this case that control unit 50 permanently opens first semiconductor switch 48 immediately after separating interchangeable drive unit 14 from electromechanical interface 22, in order to avoid a short-circuit of charging device 36. After recognizing charging device 36, control unit 50 permanently closes second semiconductor switch 54 and further semiconductor switch 56 until the charging process of battery 26 is completed. With the aid of second and further semiconductor switch 54, 56, control unit 50 may also intentionally control the charging process, for example for maintaining a charging state or charging to a maximal charging limit that was previously set at battery-operated device 10. However, this control generally takes place directly in charging device 36. It is possible, however, that charging device 36 and control unit 50 of battery-operated device 10 communicate with one another via electromechanical interface 22, in order to control the charging process accordingly. The communication may take place per modulated data signal via the two contacts 44 and 46 of electromechanical interface 22 or alternatively or additionally via further, not shown electrical contacts of electromechanical interface 22.

Moreover, it should be noted that electromechanical interface 22 of battery-operated device 10 as well as the counter-interface of interchangeable drive unit 14 and of charging device 36 may also include coils instead of electrical contacts for inductive energy and/or data transfer, for example per NFC or the like.

Figure 3B:
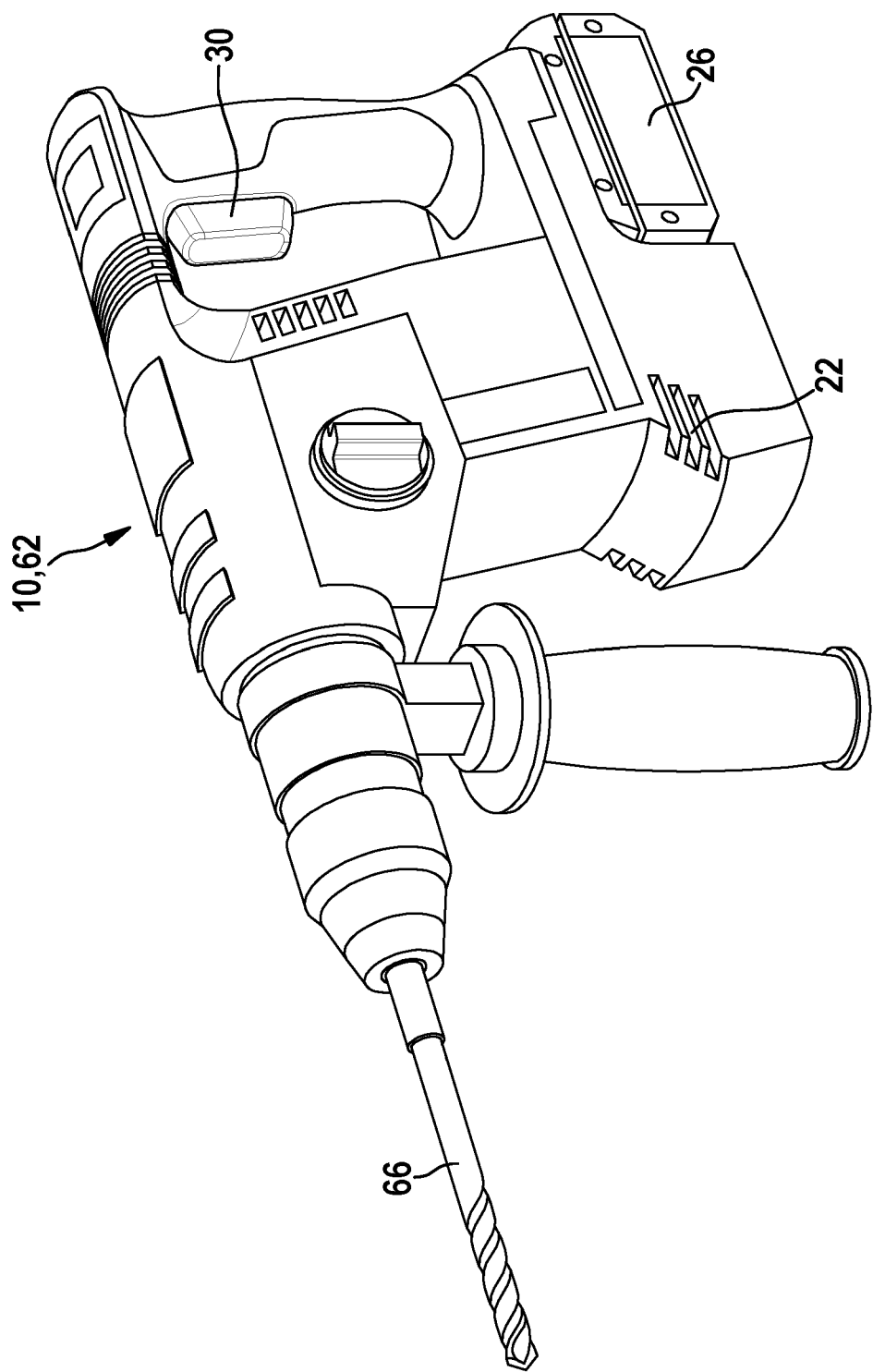
FIG. 3b shows the percussion drill from FIG. 3a in a second perspective view without an interchangeable drive unit, in accordance with an example embodiment of the present invention.

FIGS. 3a and 3b show a second exemplary embodiment of the present invention on the basis of a battery-operated device 10 designed as a percussion drill 62. As already shown in the case of cordless vacuum cleaner 12 according to FIGS. 1a through 1c, percussion drill 62 may also be detachably connected to an interchangeable drive unit 14 in the form of a suction device 64 via an electromechanical interface 22 (cf. FIG. 3b). A locking device 20 of suction device 64 is used among other things to detachably connect suction device 64. Suction device 64 moreover includes an electric motor (not shown) as a suction motor for drilling debris, drilling dust, or the like, which is supplied with the power of an interchangeable battery pack 26 via electromechanical interface 22. A detailed description of percussion drill 62 as well as suction device 64 is to be dispensed with in this case, since these are conventional. If a master switch 30 of percussion drill 62 is actuated, the electric motor of suction device 64 is also activated via electromechanical interface 22 in addition to a drilling tool 66 being driven. Electromechanical interface 22 is configured in such a way that it continues to run for a few seconds after master switch 30 has been released in order to reliably suction further drilling dust. Analogously to FIGS. 1c and 2b, interchangeable battery pack 26 may now be charged via electromechanical interface 22, without having to remove it from percussion drill 62. For this purpose, a charging adapter (not shown) that is connected via a cable to charging device 36 may be attached at percussion drill 62. Directly attaching an appropriately designed charging device 36 is naturally also possible.

Finally, it should be noted that the present invention is not limited to the shown exemplary embodiments according to FIGS. 1 through 3. The present invention may, for example, also be applied to a battery-operated measuring device in the form of a laser rangefinder or a cross-line laser that includes an electromechanical interface for activating a motor-driven swivel base. The present invention may also be applied to other battery-operated devices including a corresponding electromechanical interface, such as household appliances or gardening tools. In addition, it should be mentioned again that the present invention is not limited to removable batteries and interchangeable battery packs, but is also applicable to battery-operated devices having fixedly integrated rechargeable batteries.

What is claimed is:

1. A battery-operated device, comprising:
a rechargeable battery; and
an interchangeable drive unit that is supplied with power by the rechargeable battery via an electromechanical interface;
wherein the rechargeable battery is chargeable via the electromechanical interface,
wherein a first contact of the at least two electric contacts of the electromechanical interface or the coil of the electromechanical interface, is connected to a drain or collector terminal of a first semiconductor switch,
wherein a control unit detects a voltage drop via the first semiconductor switch or the coil,
wherein the first semiconductor switch is part of a power output stage including at least one second semiconductor switch,
wherein the battery-operated device is a cordless vacuum cleaner and the interchangeable drive unit is a motor-driven suction nozzle,
wherein a further semiconductor switch is connected in series to the power output stage, the control unit activating the first and second semiconductor switches of the power output stage and the further semiconductor switch in such a way that upon connecting the suction nozzle to the electromechanical interface and as a function of a master switch of the cordless vacuum cleaner, a power supply of the suction nozzle takes place via the rechargeable battery.

2. The battery-operated device as recited in claim 1, wherein the electromechanical interface includes at least two electrical contacts or a coil for supplying the interchangeable drive unit with power.

3. The battery-operated device as recited in claim 2, wherein a second contact of the at least two electric contacts of the electromechanical interface or the coil of the electromechanical interface, is connected to a source or emitter terminal of the first semiconductor switch.

4. The battery-operated device as recited in claim 3, wherein the control unit recognizes as a function of the voltage drop, whether the interchangeable drive unit or a charging device is connected to the electromechanical interface.

5. A battery-operated device, comprising:
a rechargeable battery; and
an interchangeable drive unit that is supplied with power by the rechargeable battery via an electromechanical interface;
wherein the rechargeable battery is chargeable via the electromechanical interface, wherein the electromechanical interface includes at least two electrical contacts or a coil for supplying the interchangeable drive unit with power, wherein a first contact of the at least two electric contacts of the electromechanical interface or the coil of the electromechanical interface, is connected to a drain or collector terminal of a first semiconductor switch and a second contact of the at least two electric contacts of the electromechanical interface or the coil of the electromechanical interface, is connected to a source or emitter terminal of the first semiconductor switch, wherein a control unit detects a voltage drop via the first semiconductor switch or the coil and recognizes as a function of the voltage drop, whether the interchangeable drive unit or a charging device is connected to the electromechanical interface, wherein the first semiconductor switch is part of a power output stage including at least one second semiconductor switch, wherein a further semiconductor switch is connected in series to the power output stage, the control unit activating the first and second semiconductor switches of the power output stage and the further semiconductor switch in such a way that when the interchangeable drive unit is connected to the electromechanical interface, a power supply of the interchangeable drive unit takes place using the rechargeable battery and when the charging device is connected to the electromechanical interface, a charging of the rechargeable battery takes place.

* * * * *